United States Patent [19]

Ikenoya et al.

[11] 4,430,857
[45] Feb. 14, 1984

[54] EXHAUST GAS CLEANING SYSTEM FOR A V-TYPE INTERNAL COMBUSTION ENGINE

[75] Inventors: Yasuo Ikenoya, Kawagoe; Youzi Simizu, Wako, both of Japan

[73] Assignee: Honda Giken Kogyo Kabushiki Kaisha, Tokyo, Japan

[21] Appl. No.: 329,992

[22] Filed: Dec. 11, 1981

[30] Foreign Application Priority Data

Dec. 12, 1980 [JP] Japan ............................ 55-178310[U]

[51] Int. Cl.³ ............................................... F01N 3/30
[52] U.S. Cl. ......................................... 60/274; 60/293; 60/305
[58] Field of Search ........................... 60/274, 293, 305

[56] References Cited

U.S. PATENT DOCUMENTS 3,751,915 8/1973 Ranft ...................................... 60/293

FOREIGN PATENT DOCUMENTS 53-148619 12/1978 Japan ...................................... 60/293
55-46009 3/1980 Japan ...................................... 60/293
55-151113 11/1980 Japan ...................................... 60/293

Primary Examiner—Douglas Hart
Attorney, Agent, or Firm—Posnack, Roberts, Cohen & Spiecens

[57] ABSTRACT

An exhaust gas cleaning system for an internal combustion engine including two cylinders arranged in V-shape and an exhaust system having exhaust ports. A secondary air supplying system is connected to the exhaust system for supply of secondary air. Reed valve devices responsive to an exhaust gas pulsation pressure are incorporated in the secondary air supplying system and are opened and closed under the action of exhaust gas pulsation developing during engine operation. The reed valve devices are disposed in a space defined between the two cylinders. The reed valve devices are connected to the exhaust ports through respective secondary air supplying pipes which form a part of the secondary air supplying system. The secondary air supplying pipes are wound so as to surround the respective cylinders.

16 Claims, 6 Drawing Figures

4,430,857

EXHAUST GAS CLEANING SYSTEM FOR A V-TYPE INTERNAL COMBUSTION ENGINE

BACKGROUND OF THE INVENTION

This invention relates to an exhaust gas cleaning system for a so-called V-type internal combustion engine having two cylinders arranged in V-shape.

More particularly, the present invention relates to an exhaust gas cleaning system in which secondary air is introduced into an exhaust system of the engine to burn unburnt detrimental components in the exhaust gas.

SUMMARY OF THE INVENTION

It is an object of the present invention to provide an exhaust gas cleaning system for a V-type internal combustion engine of the character described, which is simple in structure and can be compactly fitted on the engine in a dead space defined between the V-arranged two cylinders without hindering the layout and maintenance of other devices; and which is easy to maintain and is protected from contact with other members; and which does not degrade the overall appearance of the engine when fitted thereto.

It is another object of the present invention to provide an exhaust gas cleaning system for an internal combustion engine of the character described, which can be effectively cooled to insure the proper cleaning operation over an extended period of time and can greatly prolong its service life.

It is still another object of the present invention to provide an exhaust gas cleaning system for an internal combustion engine of the character described, which is improved in assemblability and requires a reduced number of components so as to simplify the construction.

The above and other objects, features and advantages of the present invention will become apparent from the following detailed description of a preferred embodiment when taken in conjunction with the accompanying drawings.

BRIEF DESCRIPTION OF THE DRAWINGS

FIG. 6 is a sectional view taken along line VI—VI in FIG. 2.

DESCRIPTION OF THE PREFERRED EMBODIMENTS

Figure 1:
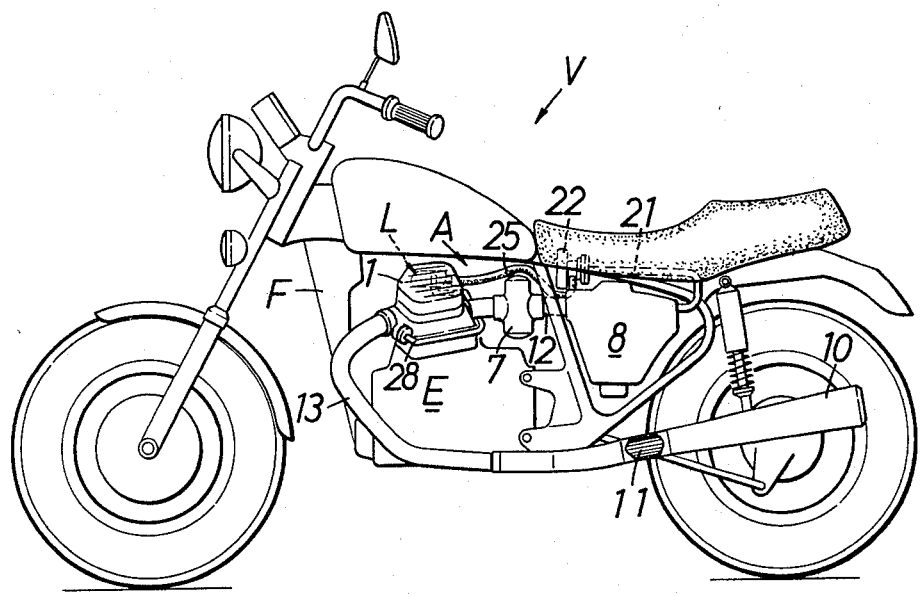
FIG. 1 is a side view of a motorcycle having an internal combustion engine equipped with an exhaust gas cleaning system in accordance with the present invention.
Figure 3:
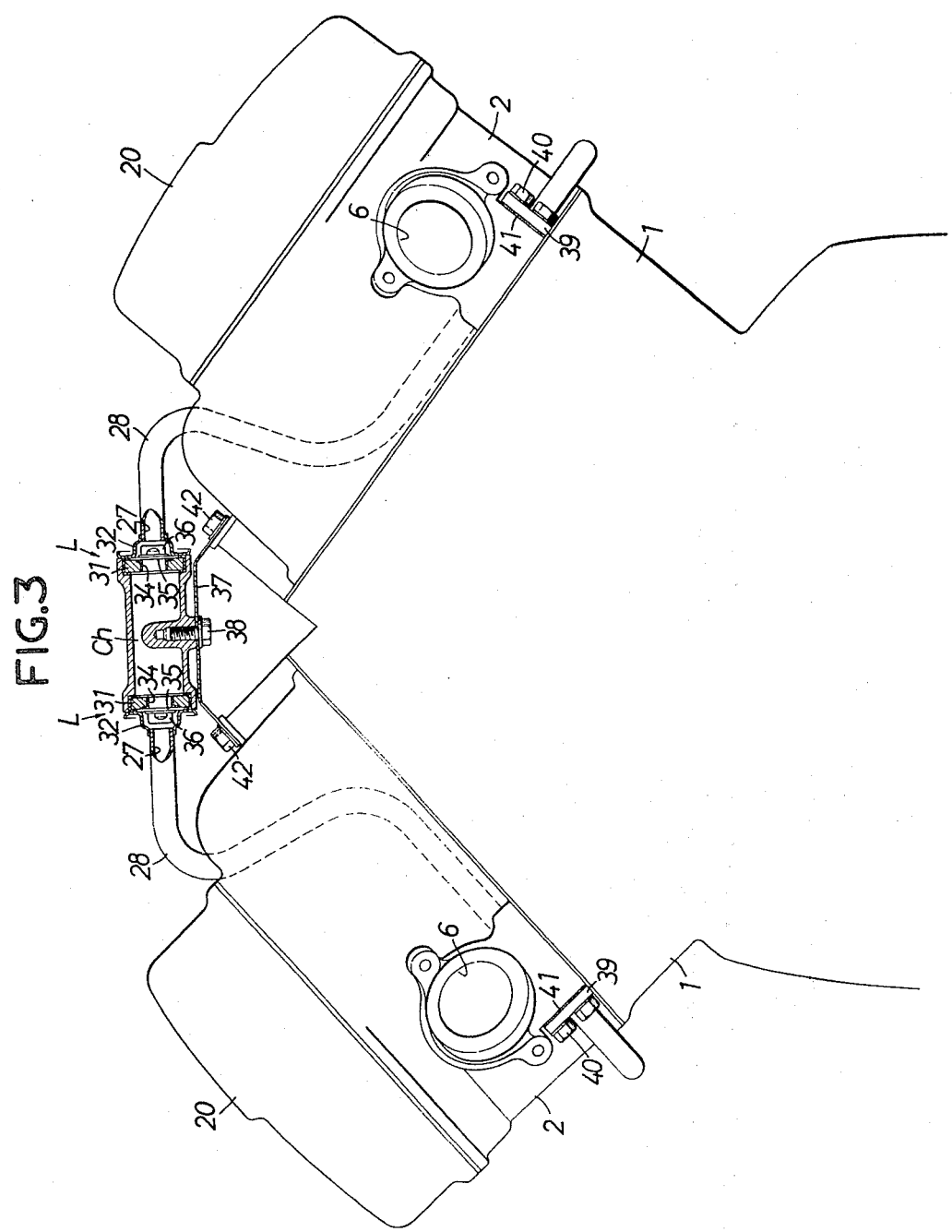
FIG. 3 is a sectional view taken along line III—III in FIG. 2.
Figure 4:
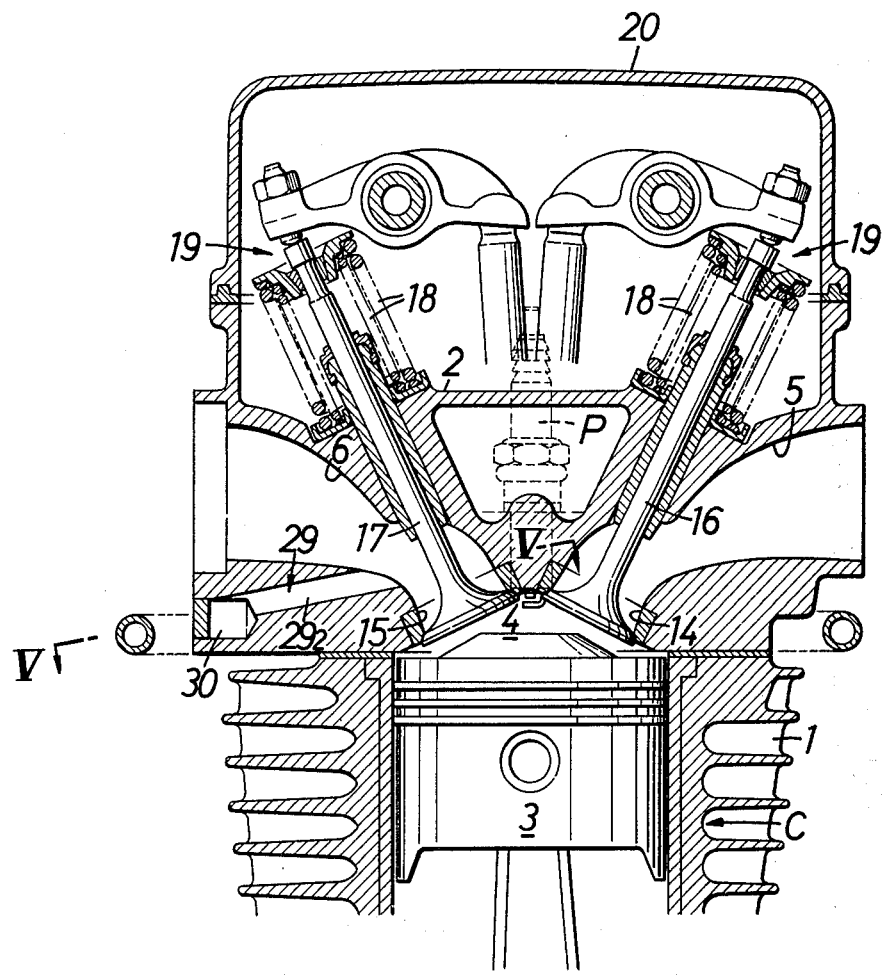
FIG. 4 is a sectional view taken along line IV—IV in FIG. 2.
Figure 5:
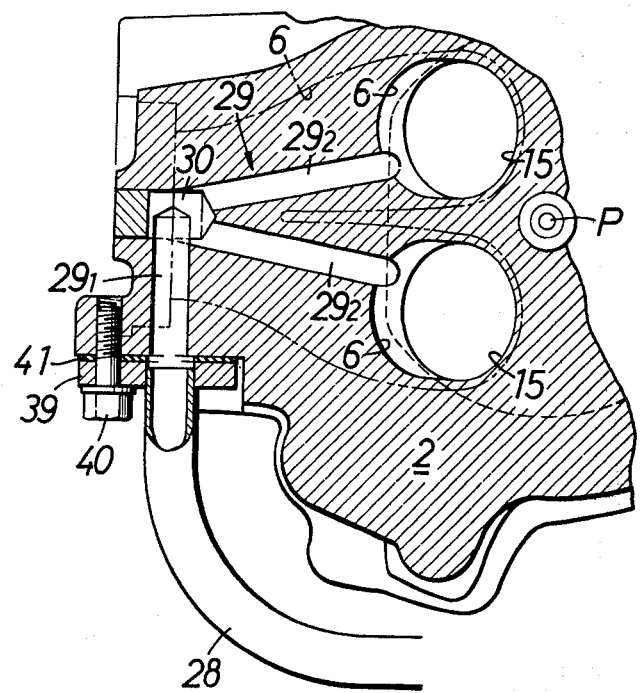
FIG. 5 is a sectional view taken along line V—V in FIG. 4.

Hereinafter, a prefererd embodiment of the present invention will be described in detail with reference to the accompanying drawings. In FIGS. 1 and 3, a V-type internal combustion engine E having two cylinders 1, 1 transversely arranged in a V-shape is mounted on the frame F of a motorcycle V. An intake port 5 is formed in the rear half of a cylinder head 2 of each cylinder 1 so as to communicate with a combustion chamber 4 defined in each cylinder bore above a piston 3 while an exhaust port 6 is defined in the front half of the cylinder head 2 so as to communicate with the combustion chamber 4. Each intake port 5 opens at the rear surface of the cylinder 1 and each exhaust port 6 opens at the front surface thereof. An intake pipe 12 leading to a carburetor 7 is connected to the intake port 5 and an air cleaner 8 is connected to the rear end portion of the intake pipe 12. As shown in FIG. 5, the exhaust port 6 is bifurcated from the externally open end portion towards the combustion chamber 4 and communicates at the respective bifurcated ends with exhaust valve openings 15, 15 that open to the combustion chamber 4. An exhaust pipe 13 is connected to the external open end of the exhaust port 6 and a muffler 10 is connected to the rear end of the exhaust pipe 13. A catalytic converter 11 for reaction and cleaning of the exhaust gas is disposed in the muffler 10. Two intake valve openings 14, 14 are formed to open to the combustion chamber 4 in opposing relation to the exhaust valve openings 15, 15 respectively.

As is customary in the art, the cylinder head 2 is equipped with intake and exhaust valves 16, 16; 17, 17 for opening and closing the intake and exhaust valve openings 14, 14; 15, 15 of the intake and exhaust ports 5; 6. Those valves are actuated by cooperation of valve springs 18, 18 and valve operating mechanisms 19, 19. A spark plug P is screwed into the cylinder head 2 at a position between the intake and exhaust valves 16, 16; 17, 17 with its electrode being present in the combustion chamber 4. A cylinder head cover 20 is mounted on the cylinder head 2.

Figure 2:
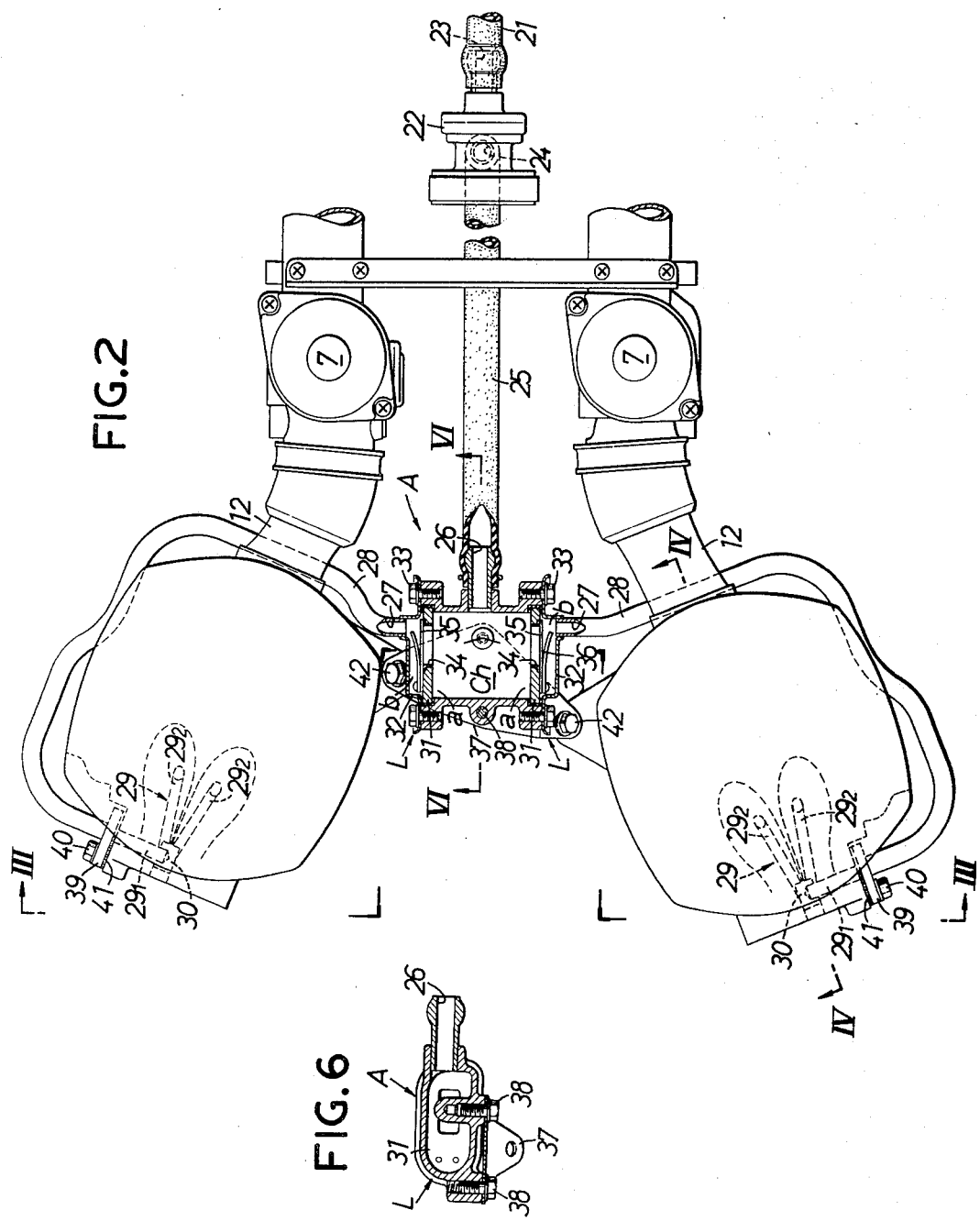
FIG. 2 is a plan view, partly broken away and in section, showing a secondary air supplying system of the engine.

A secondary air supplying system A is connected between the body of the internal combustion engine and the air cleaner 8 in order to feed secondary air to the exhaust ports 6. This secondary air supplying system A will be described below. As shown in FIG. 2, a secondary air intake pipe 21 is connected at one end with the air cleaner 8 and at the other end with an inlet 23 of a known air control valve 22 which is operated to open in response to the starting of the engine E. The air control valve 22 has an outlet 24 connected to a main secondary air supplying pipe 25 which is, in turn, connected to an inlet 26 of a secondary air reservoir chamber Ch having a relatively large capacity.

As shown in FIG. 3, the secondary air reservoir chamber Ch is fixedly mounted by a mounting bolt 38 onto a support member 37 which bridges between the V-arranged right and left cylinders 1, 1 and is secured thereto by fixing bolts 42, 42 in a substantially horizontal manner. The mounting position of the chamber Ch can be adjusted in the transverse direction by making the fitting holes for the fixing bolts 42, 42 greater in diameter than the bolt 42. Vertical adjustment of the chamber Ch can be made by interposing a spacer between the cylinders 1 and the support plate 37. A V-shaped space is defined between the right and left cylinders 1, 1 and the secondary air reservoir chamber Ch. Reed valve devices L, L, which will be described later in further detail, are disposed on the right and left sides of the secondary air reservoir chamber Ch, and secondary air supplying pipes 28, 28 are connected with outlets 27, 27 of the reed valve devices L, L, respectively. As shown in FIG. 2, these pipes 28, 28 are wound to surround the outer surfaces of the cylinders 1, 1 and extend toward fitting flanges 39 welded thereto. As clearly shown in FIG. 5, each fitting flange 39 is fixed by a fitting bolt 40 to the cylinder head 2 via a gasket 41, and the secondary air supplying pipes 28, 28 communicate with the exhaust ports 6, 6, respectively, via secondary air distribution passages 29, 29 formed at the front portion of the cylinder head 2.

The secondary air supplying pipes 28, 28 have substantially the same length and diameter so that pulsating pressure at the exhaust ports 6, 6 acts substantially equally on the right and left reed valves L, L. The secondary air supplying pipes 28, 28 are formed of a metal and plated on their surface with nickel, chromium or the like. As clearly shown in FIG. 5, each of the secondary air distribution passages 29 consists of a main passage $29_1$ communicating with the secondary air supplying pipe 28 and a pair of branch passages $29_2$, $29_2$ that are bifurcated at the inner end of the main passage $29_1$ via an expansion chamber 30. The inner ends of the branch passages $29_2$, $29_2$ communicate with the exhaust port 6 in the vicinity of the exhaust valve openings 15, 15.

The reed valve devices L are disposed at the right and left portions of the secondary air reservoir chamber Ch. Each valve device L comprises a reed valve body 31 and a valve cover 32 jointly secured to the secondary air reservoir chamber Ch by several mounting bolts 33. The secondary air reservoir chamber Ch defines an upstream chamber a of the reed valve device L and the valve cover 32 defines therein a downstream chamber b. The secondary air supplying pipe 28 is welded or brazed at one end to the downstream chamber b. A valve port 34 is formed in the reed valve body 31 with a reed 35 secured thereto for opening and closing the valve port 34. The reed 35 is forced under pulsations of exhaust gas to open in an increasing sense until it strikes a stopper 36 so that secondary air is permitted to flow only from the upstream chamber a to the downstream chamber b. When exhaust pulsations develop at the exhaust port 6 due to the operation of the internal combustion engine E, the reed 35 is caused under exhaust pulsations to open and close the valve port 34 to distribute the secondary air inside the upstream chamber a, or the secondary air reservoir chamber Ch, to the exhaust valve openings 15, 15 of the exhaust port 6 via the secondary air supplying pipe 28, the main passage $29_1$, the expansion chamber 30 and the branch passages $29_2$, $29_2$.

Now, the operation of the device of this embodiment will be described. When the multiple-cylinder internal cmbustion engine E is operated, the exhaust pulsating pressure is generated at the exhaust port 6. This pulsating pressure passes through the branch passages $29_2$, the expansion chambers 30, the main passages $29_1$ and the secondary air supplying pipes 28 into the reed valve devices L to open the latter. Part of the clean air inside the air cleaner 8 is led into these two reed valve devices L via the secondary air intake pipe 21, the air control valve 22 and the main secondary air supplying pipe 25 and then, is directly introduced to the two exhaust ports 6 in the vicinity of the exhaust valves 17 via the secondary air supplying pipes 28, the main passages $29_1$, the expansion chambers 30 and the branch passages $29_2$. In this case, secondary air is directly distributed to each exhaust port 6 opening to the combustion chamber 4. Inside each exhaust port 6, exhaust gas and secondary air are uniformly mixed. Moreover, because the secondary air is directly fed to the exhaust ports 6 in the vicinity of the exhaust valve openings 15, the secondary air can be mixed with the high temperature exhaust gas, thereby further promoting the recombustion of the exhaust gas as a whole.

The secondary air, flowing into the expansion chamber 30, is once stored therein to stabilize its flow rate so that it is equally distributed to the branch portions of the exhaust port 6 via the secondary air distribution passages 29, 29. Accordingly, the secondary air can be fed in an optimal quantity for burning HC, CO in the exhaust gas to effectively purify the exhaust gas.

The formation of the expansion chambers 30 in the cylinder head 2 increases freedom in arrangement of the secondary air supplying pipes 28 with respect to its mounting direction and position to facilitate the connection thereof to the secondary air distribution passages 29, 29 communicating with the branch portions of the exhaust ports 6. This arrangement is especially effective for the internal combustion engines of motorcycles having only a limited mounting space.

The present invention as described in the foregoing provides the following advantages. The reed valve devices are disposed in a dead space between the V-arranged two cylinders of the internal combustion engine without hindering the layout and maintenance of the other devices. As the regions around the reed valve devices are kept open, maintenance of the reed valve devices becomes easy.

Since the outlets of the reed valve devices and the exhaust ports of the engine communicate with one another by the secondary air supplying pipes surrounding the cylinders, each secondary air supplying pipe has only a limited outwardly protruding portion so as to avoid its contact with other portions and resulting damage. Furthermore, the head cover of the engine is detachable without any contact with the exhaust gas cleaning system so that maintenance, such as tappet adjustment, can be easily made.

If the secondary air supplying pipe is formed of metal, it can be plated with the same material as that of the exhaust pipe, e.g., nickel, chromium or the like, so as to match the external appearance thereof with other devices, thus improving the appearance of the engine as a whole equipped with the inventive exhaust gas cleaning system.

Since the reed valve devices are integrally fitted to the cylinders via the support member bridgingly connected to the two cylinders, the reed valve devices and the engine body always vibrate as an integral unit whereby the secondary air supplying pipe connected therebetween can be formed of a rigid metallic material because no excessive force acts thereupon, thus improving the durability and reliability.

The reed valve devices are kept open therearound for excellent coolability to prevent heat deterioration of the constituent components thereof, insuring the intended proper operation of the exhaust gas cleaning system for an extended period of time.

The secondary air supplying pipes, formed of a metallic material, may have one of the ends thereof integral with the reed valve devices so as to be used to form a part of the reed valve devices, and the other ends formed integral with the support member bridging the V-arranged two cylinders. With this arrangement, the secondary air supplying pipes can be readily attached to the reed valve devices and the engine body simply by fitting the opposite ends thereof to the reed valve devices and the engine body and fastening them by virtue of fastening means such as bolts, thus greatly enhancing the assemblability thereof. Since one of the ends of the secondary air supplying pipes are used also as the compenents for the reed valve devices while the other ends thereof are integral with the support member fixed to the engine body, the overall construction of the secondary air supplying system can be remarkably simplified to reduce the cost of production.

While a presently preferred embodiment of the invention has been shown and described, it will be clearly understood to those skilled in the art that various changes and modifications may be made without departing from the spirit of the invention and the scope of the appended claims.

What is claimed is:

1. An exhaust gas cleaning system for an internal combustion engine including two cylinders arranged in V-shape and an exhaust system with exhaust ports, comprising: secondary air supplying means connected to said exhaust system for supplying secondary air thereto; reed valve means incorporated in said secondary air supplying means and adapted to open and close under the action of pulsating pressure of exhaust gas developing during engine operation, said reed valve means being disposed in a space defined between said two cylinders; and secondary air supplying pipe means connecting said reed valve means with said exhaust ports and forming a part of said secondary air supplying means, said pipe means being wound so as to surround said respective cylinders, said secondary air supplying means including an expansion chamber in each cylinder, a main passage in each cylinder connecting said pipe means to said expansion chamber and a second passage connecting said expansion chamber to the exhaust port of the respective cylinder, said second passage being bifurcated and including two branches extending from said expansion chamber to respective exhaust ports of the respective cylinder.

2. An exhaust gas cleaning system as claimed in claim 1, wherein said secondary air supplying pipe means comprises a pair of metallic pipes having plated outer surfaces.

3. An exhaust gas cleaning system as claimed in claim 1, comprising a support member bridging between and connected with said two cylinders, said reed valve means being mounted on said support member.

4. An exhaust gas cleaning system as claimed in claim 3, wherein said secondary air supplying pipe means has one end formed integrally with said reed valve means so as to form a part of the latter, and the other end formed integrally with said support member.

5. An exhaust gas cleaning system as claimed in claim 1 wherein each cylinder has front and rear sides and inner and outer sides, said reed valve means being mounted between said inner sides, said pipe means extending from said reed valve means around the rear and outer sides of each cylinder to the front sides thereof.

6. An exhaust gas cleaning system as claimed in claim 1 wherein said main passage is located in said cylinder at the front side thereof.

7. An exhaust gas cleaning system as claimed in claim 5 wherein said reed valve means includes a secondary air reservoir chamber having an inlet for secondary air and opposite ends, and a reed valve device on each end of the secondary air reservoir chamber for supplying secondary air to said pipe means and thereby to said respective cylinders.

8. An exhaust gas cleaning system as claimed in claim 7 wherein said pipe means includes first and second pipes each extending from a respective reed valve device around the rear and outer sides of the associated cylinder to the front thereof.

9. An exhaust gas cleaning system as claimed in claim 8 comprising a support member bridging between and connected to said two cylinders, said secondary air reservoir chamber being mounted on said support member.

10. An exhaust gas cleaning system as claimed in claim 9 wherein said cylinders have a common block and respective cylinder heads thereon, said support member and reed valve means being disposed between said cylinder heads.

11. An exhaust gas cleaning system as claimed in claim 2 wherein the coating of said secondary air supply pipe is a metal.

12. An exhaust gas cleaning system as claimed in claim 11 wherein said metal is nickel or chromium.

13. An exhaust gas cleaning system claimed in claim 1 wherein each cylinder has front and rear sides and inner and outer sides, said reed valve means being mounted between said inner sides, said pipe means extending from said reed valve means past the inner side.

14. A method of cleaning the exhaust gases of an internal combustion engine having two cylinders arranged in V-shape and an exhaust system with exhaust ports, said method comprising supplying secondary air to the exhaust system of the engine to burn unburnt products therein, controlling the supply of the secondary air to the exhaust system of the engine from a location in the space between the cylinders in response to pulsating pressure of exhaust gases developed during engine operation, feeding the secondary air via said controlled supply in respective paths around the rear of each cylinder and the outer sides thereof to inlets at the front sides thereof and further feeding the secondary air from said inlet of the respective cylinder to an expansion chamber and then along a bifurcated path to respective exhaust ports of the associated cylinder.

15. A method as claimed in claim 14 wherein the flow of secondary air is controlled to flow from a single supply conduit to said respective paths.

16. A method as claimed in claim 14 wherein said controlled supply is effected in pulses.

* * * * *